H. M. BURDICK.

Hay Tedders.

No. 5,991.

Reissued July 28, 1874.

Witnesses:

H. A. Daniels

A. K. Parris

Inventor:

Hiram M. Burdick

By W. Burris Atty.

THE GRAPHIC CO. PHOTO-LITH. 39 & 41 PARK PLACE, N.Y.

UNITED STATES PATENT OFFICE.

HIRAM M. BURDICK, OF ILION, NEW YORK, ASSIGNOR, BY MESNE ASSIGNMENTS, TO HIMSELF, TENNIS V. LE ROY, AND PHILO REMINGTON.

IMPROVEMENT IN HAY-TEDDERS.

Specification forming part of Letters Patent No. 95,647, dated October 12, 1869; reissue No. 5,991, dated July 28, 1874; application filed February 13, 1874.

*To all whom it may concern:*

Be it known that I, HIRAM M. BURDICK, of Ilion, in the county of Herkimer and State of New York, have invented certain new and useful Improvements in Hay-Tedders; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
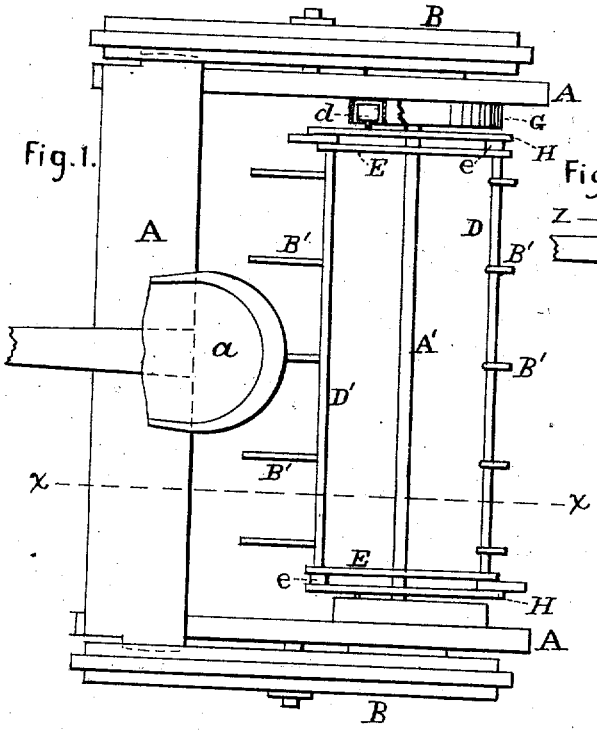
Figure 2:
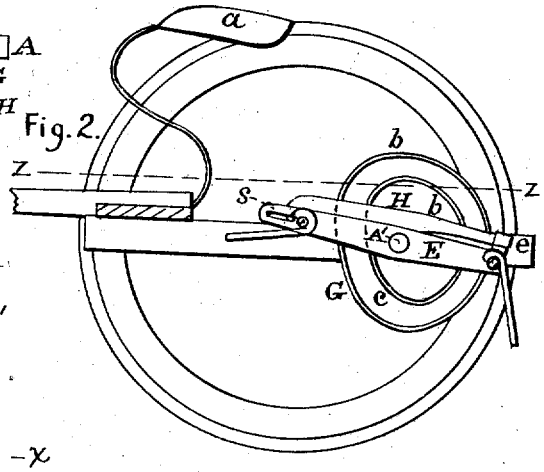
Figure 3:
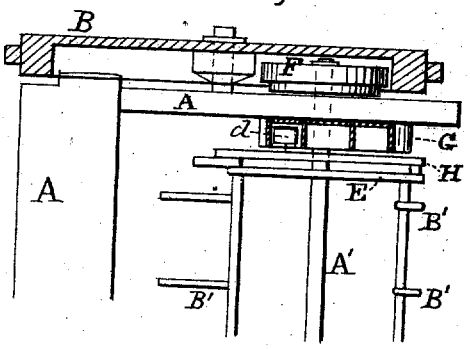
Figure 4:
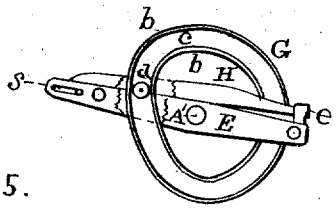
Figure 5:
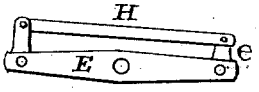
Figure 6:
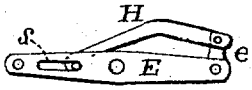

Figure 1 is a plan view. Fig. 2 is a section taken on the line *x x* of Fig. 1. Fig. 3 is a section taken on the line *z z* of Fig. 2. Fig. 4 is a view of the continuous cam and roller detached. Figs. 5 and 6 are modifications of the mode of attaching the connecting-bar.

My invention relates to a hay-tedder having rocking fork-rods and continuous cams for imparting rocking motion to the fork-rods.

In the drawings, A represents the tedder-frame; B B, the wheels; C, the pole; and *a*, the driver's seat. A′ is the reel-shaft, having its bearings in the frame A. B′ represents the tines fastened to the rods D D′, which have their bearings in the arms E E′ on the shaft A′. F F are friction-wheels on the ends of the reel-shaft, arranged to be operated by contact with the projecting flanges on wheels B B. On the inner side of each of the end beams of the frame A is secured a cam, G, provided with two flanges, *b b*, forming a continuous camway, *c*, in which runs the friction-roller *d*, which revolves on a pin attached to a connecting-bar, F, one end of which bar is pivoted to a short crank, *e*, which is fastened to the end of the fork-rod D, and the other end of the bar is held by a pin attached to the bar and extending through a slot, *s*, in an extension of the arm E, as shown in Fig. 4.

The extension of the arm E may be dispensed with by forming the slot in the arm between the rod and shaft, or by attaching the end of the bar to a loose crank on the end of the arm E, which modifications are represented in Figs. 5 and 6 of the drawings.

The cam is arranged with one part of the camway nearer than the other part to the shaft A′, for the purpose of rocking the fork-rod.

In Fig. 2 of the drawings, the part of the cam nearest the shaft is in front, and when the roller reaches that part of the camway the bar H is thrown backward, which, by means of the crank *e*, rocks the fork-rod D backward, dipping the points of the tines downward, so that they readily clear themselves of the grass as they rise upon the revolving reel; and as the roller moves around to the other part of the camway the bar H is thrown forward rocking the rod D forward and placing the tines in position to spread the grass.

Similar devices are arranged at the other end of the reel to operate in the same manner the fork-rod D′.

What I claim, and desire to secure by the reissue of the said Letters Patent, is—

1. The combination of a rocking fork-rod, D, with a continuous cam, G, having double walls or flanges *b b* and camway *c* on the disk of the cam, substantially as and for the purposes described.

2. In combination with the rocking fork-rod D, the continuous double-flanged cam and camway G *c*, the roller *d*, crank *e*, and bar H, substantially as and for the purposes described.

In testimony that I claim the foregoing I have hereunto set my hand and seal this 5th day of February, 1874.

H. M. BURDICK. [L. S.]

Witnesses:

THOS. RICHARDSON,
T. F. MCWERNEY.